US006861130B2

(12) United States Patent
D'Evelyn et al.

(10) Patent No.: US 6,861,130 B2
(45) Date of Patent: Mar. 1, 2005

(54) SINTERED POLYCRYSTALLINE GALLIUM NITRIDE AND ITS PRODUCTION

(75) Inventors: Mark P. D'Evelyn, Niskayuna, NY (US); David C. Pender, Schenectady, NY (US); Suresh S. Vagarali, Columbus, OH (US); Dong-Sil Park, Niskayuna, NY (US)

(73) Assignee: General Electric Company, Pittsfield, MA (US)

( * ) Notice: Subject to any disclaimer, the term of this patent is extended or adjusted under 35 U.S.C. 154(b) by 324 days.

(21) Appl. No.: 10/001,575

(22) Filed: Nov. 2, 2001

(65) Prior Publication Data

US 2003/0086856 A1 May 8, 2003

(51) Int. Cl.[7] .............................. B28B 3/00; C01B 21/06
(52) U.S. Cl. ........................ 428/220; 264/604; 423/409
(58) Field of Search ................................ 423/290, 409; 264/604; 428/98, 220

(56) References Cited

U.S. PATENT DOCUMENTS

| | | | | |
|---|---|---|---|---|
| 3,829,556 A | * | 8/1974 | Logan et al ................. | 423/290 |
| 4,146,379 A | * | 3/1979 | Copley et al. ............... | 264/654 |
| 6,096,282 A | | 8/2000 | Kaner et al. ................. | 423/409 |
| 6,113,985 A | | 9/2000 | Suscavage et al. .......... | 427/255 |
| 6,120,748 A | * | 9/2000 | Kaner et al. ................. | 423/290 |
| 6,177,057 B1 | * | 1/2001 | Purdy .......................... | 423/290 |
| 6,270,569 B1 | | 8/2001 | Shibata et al. ................ | 117/68 |

OTHER PUBLICATIONS

R. Dwilinski et al, "GaN Synthesis by Ammo–nothermal Method," Acta Physica Polonica, A, 88 (5), 833–6 (English), 1995 v(Abstract only), no month.*

* cited by examiner

*Primary Examiner*—Wayne A. Langel

(57) ABSTRACT

Polycrystalline gallium nitride (GaN) characterized by having the atomic fraction of gallium ranging from between about 49% to 55%, an apparent density of between about 5.5 and 6.1 g/cm$^3$, and a Vickers hardness of above about 1 GPa. Polycrystalline GaN can be made by hot isostatic pressing (HIPing) at a temperature ranging from about 1150° C. to 1300° C. and a pressure ranging from between about 1 and 10 Kbar. Alternatively, polycrystalline GaN can be made by high pressure/high temperature (HP/HT) sintering at a temperature ranging from about 1200° to 1800° C. and a pressure ranging from about 5 to 80 Kbar.

26 Claims, 5 Drawing Sheets

SINTERED POLYCRYSTALLINE GALLIUM NITRIDE AND ITS PRODUCTION

STATEMENT REGARDING FEDERALLY SPONSORED RESEARCH

This invention was reduced to practice under the support of NIST contract, Cooperative Agreement number 70NANB9H3020.

CROSS-REFERENCE TO RELATED APPLICATIONS

None

BACKGROUND OF THE INVENTION

The present invention relates generally to polycrystalline gallium nitride (GaN) and more particularly to sintered polycrystalline GaN and its production by high pressure/high temperature (HP/HT) techniques.

Polycrystalline GaN is useful in a number of applications, primarily motivated by the rapid growth of GaN-based optoelectronics and electronic devices. These applications include, inter alia, sputtering targets and source material for bulk crystal growth.

Two methods for producing polycrystalline GaN are reported in the art. In the first method, GaN powder is cold pressed into a compact. Balkas, et al., *J. Cryst. Growth*, 208, 100 (2000). Unfortunately, little or no chemical bonding between GaN grains is present in the cold pressed material, as the apparent density is only about 2 g/cm$^3$, much lower than the theoretical density (6.1 g/cm$^3$). It is of marginal utility as a sputter target, due to residual porosity and moisture sensitivity. It also is not useful as a source for crystal growth, because it rapidly disintegrates back into powder in the presence of gallium nitride solvent.

In the second method, chemical vapor deposition (CVD) is used to form polycrystalline GaN films. Several proposals exist on this second method. For example, U.S. Pat. No. 6,113,985 proposes a method whereby ammonium chloride transports Ga atoms from a Ga metal source and deposits them as polycrystalline GaN on a substrate. Argoita, et al., (*Appl. Phys. Lett.*, 70, 179 (1997)) teach a method for treating Ga metal in a nitrogen-containing plasma, thereby forming a polycrystalline GaN film on the surface of the Ga metal. However, these CVD-like methods are expensive and do not generate a thick, dense GaN part. In addition, the grains in CVD-grown GaN are large and columnar, reducing the strength and fracture toughness. Finally, the surface of CVD-grown polycrystalline GaN films is rough, which is undesirable for use as a sputter target.

Thus, there exists a need in the art to be able to fabricate polycrystalline GaN parts of sufficient density, etc., that they are suitable for a variety of commercial uses.

BRIEF SUMMARY OF THE INVENTION

Polycrystalline gallium nitride (GaN) characterized by having the atomic fraction of gallium ranging from between about 49% to 55%, an apparent density of between about 5.5 and 6.1 g/cm$^3$, and a Vickers hardness of above about 1 GPa. The presence of residual impurities in the GaN, for example, oxygen, can result in a Ga atomic fraction somewhat below 50%.

One method for making product polycrystalline GaN includes enclosing GaN, either as loose powder or as a cold pressed pill, in a non-metallic container evacuated of air. The container is subjected to hot isostatic pressing (HIPing) at a temperature ranging from about 1150° C. to 1300° C. and a pressure ranging from between about 1 and 10 Kbar. Product polycrystalline GaN then is recovered from the container.

Another method for making product polycrystalline GaN involves placing GaN, either as loose powder or as cold pressed pill, in a non-metallic container, which then is placed in a high pressure/high temperature (HP/HT) reaction cell. The reaction cell is placed in a HP/HT apparatus. The container then is subjected to a temperature ranging from about 1200° to 1800° C. and a pressure ranging from about 5 to 80 Kbar. Product polycrystalline GaN then is recovered from the container.

Advantages of the present invention include the ability to make polycrystalline GaN in a variety of sizes and shapes. Another advantage is the ability to make polycrystalline GaN having substantially smooth surfaces. A further advantage is the ability to make polycrystalline GaN whose grains are equiaxed. Yet another advantage is the ability to make polycrystalline GaN which is hard and robust. These and other advantages will be readily apparent to those skilled in the art based on the present disclosure.

BRIEF DESCRIPTION OF THE DRAWINGS

For a fuller understanding of the nature and advantages of the present invention, reference should be had to the following detailed description taken in connection with the accompanying drawings, in which:

FIGS. 1 and 2 correspond to Example 1; FIGS. 3 and 4 to Example 2; and FIG. 5 to Example 3. The drawings will be described in detail in connection with the Examples.

DETAILED DESCRIPTION OF THE INVENTION

Figure 1:
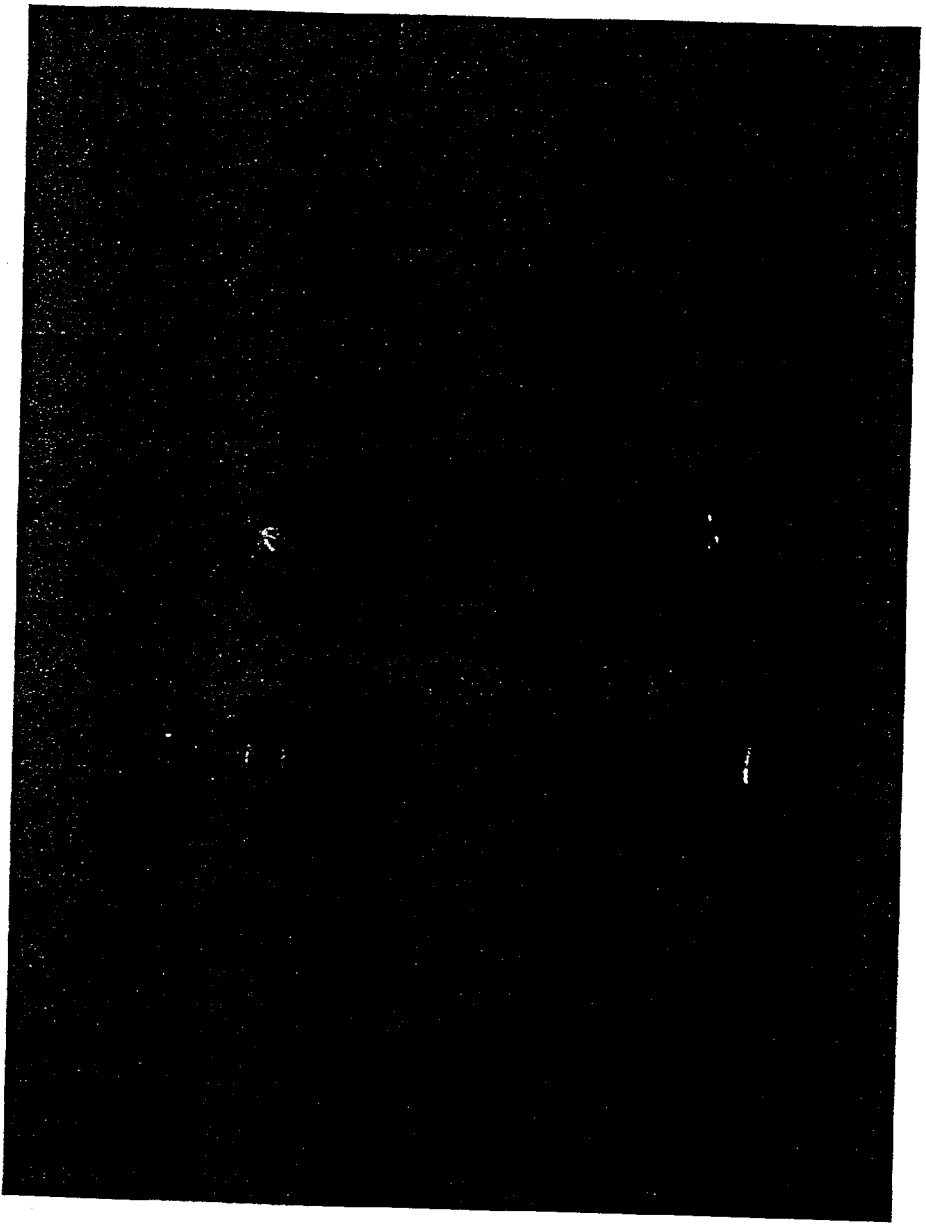
FIG. 1 is a photograph of a cold pressed GaN pill in a sealed Vycor® glass ampoule (left side) and a HIPed GaN part (polycrystalline GaN) in a squashed Vycor® glass enclosure (right side)

Sintering fine-grained GaN powder using Ga metal as a liquid-phase sintering aid results in the production of polycrystalline GaN. The Ga metal, with a volume fraction of between about 0.01% and 10%, is readily generated by the partial thermal decomposition of the GaN powder feed. Alternatively, Ga metal can simply be added to GaN powder. Excess $N_2$ gas is prevented from being released and consolidation of the GaN powder is achieved by enclosing the GaN powder in a non-metallic container and pressurizing the container at a level that is higher than the equilibrium vapor pressure of $N_2$ above GaN, as reported by Karpinski, et al. [*J. Cryst. Growth*, 66, 1 (1984)].

Metallic Ga formed by the partial decomposition of the GaN powder feed will alloy with virtually any metal. Thus, the enclosures are fabricated from a nonmetal. Suitable enclosure materials include one or more of Pyrex® brand glass, Vycor® brand glass, silica, boron nitride, magnesium oxide, calcium oxide, aluminum oxide, zirconium oxide, and yttrium oxide.

Decomposition of GaN is negligible below about 900° C. Therefore, the consolidation and sintering must be performed at a temperature in excess of about 900° C. External pressure may be applied in a hot isostatic press (so-called HIP). HIPing stands for "hot isostatic pressing". The sample is placed in a sealed container and subjected to pressure and temperature. The maximum pressure in typical HIP apparatus is ~2 Kbar, but in specialized equipment the maximum pressure can be as high as 5 or 10 Kbar. Alternatively, external pressure can be applied in a hydraulic press fitted with appropriate tooling, for example, a piston cylinder press, a belt-type press, a multi-anvil press, or a toroid-type press. Conventional high pressure/high temperature (HP/HT) apparatuses of the belt-type or die-type, are described, for example, in U.S. Pat. Nos. 2,941,241; 2,941,248; 2,947, 617; 3,609,818; 3,767,371; 4,289,503; 4,409,193; 4,673, 414; 4,810,479; and 4,954,139, and French Pat. No. 2,597, 087. Piston cylinder presses are described, for example, in F. R. Boyd and J. L. England, *J. Geophys. Res.* 65, 741 (1960), and U.S. Pat. No. 4,197,066. Multi-anvil presses are described, for example, in U.S. Pat. Nos. 2,918,699, 2,947, 034, and 3,440,687; and M. Wakatsuki, *Jpn. J. Appl. Physics* 10, 357 (1971). Toroid-type presses are described, for example, in E. S. Itskevich, *Instrum. Exper. Techniques* 42, 6 (1999).

When producing polycrystalline GaN by the HIPing method, the GaN feed powder is optionally cold-compacted, placed in a non-metallic container (e.g., Vycor® glass), placed in an isostatic press wherein the pressure is brought up greater than about 20,000 psi (1.4 kbars) and a temperature in the range of about 1150° to 1300° C. Press times range from about 2 minutes to 24 hours. Thereafter, the temperature is reduced followed by the pressure. Recovery of the product polycrystalline GaN includes, for example, grinding off the container.

When producing polycrystalline GaN by the hydraulic press method, the GaN feed powder is housed within a container that preferably also serves as a pressure-transmitting medium and placed within the press. Again, the pressure is increased to between about 5 and 80 kbars and the temperature brought up to between about 1200° and 1800° C. Press times range from about 2 minutes to 8 hours. Thereafter, the temperature is reduced followed by the pressure. Recovery of the product polycrystalline GaN includes, for example, grinding off the container/pressure-transmitting medium.

The product polycrystalline GaN can have a minimum dimension (thickness) that ranges from about 0.2 mm to about 1 m and a maximum dimension (diameter) that ranges from about 1 mm to about 1 m. The apparent density of the product polycrystalline GaN ranges from about 5.5 to about 6.1 g/cm$^3$ (theoretical density of 6.1 g/cm$^3$). The product polycrystalline GaN will have a Vickers hardness above about 1 GPa. The product configuration of the product polycrystalline GaN can range from large thin disks to solid cylinders to parallelepipeds. All surfaces of the polycrystalline GaN are substantially smooth, for example, with a root-mean-square roughness less than about 100 $\mu$m, and preferably below about 20 $\mu$m. The grains in the polycrystalline GaN are equiaxed, rather than columnar as in CVD-grown films, with an average size between about 0.01 $\mu$m and about 50 $\mu$m. The product polycrystalline GaN also is hard and robust, as evidenced by its fracture and dissolution resistance.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Commercially available GaN powder (0.3 g) was pressed in the form of a pill and then placed in a single-ended tube of Vycor® brand glass. The tube was evacuated and the open end sealed by torch welding. The sealed tube was placed inside a commercial hot isostatic press and heated at rate of 5° C./min to 1150° C., at which time the pressure was increased to 30,000 psi (2 Kbar). After full pressure was reached, the temperature was raised to 1200° C. and held for 30 minutes. The temperature then was decreased at a rate of 10° C./min and the pressure decreased to atmospheric pressure. GaN pills sealed in a Vycor® tube are shown before and after HIPing in FIG. 1.

Figure 2:
FIG. 2 is a scanning electron micrograph (1500× magnification) showing the microstructure (fracture section) of sintered polycrystalline GaN produced by HIPing according to the instant invention.

The sintered polycrystalline GaN part was removed by grinding off the quartz glass enclosure. The sintered polycrystalline GaN part was solid and hard, with a measured Vickers hardness of 2.3 GPa. The microstructure of the HIPed GaN part is shown in FIG. 2. A number of grains about 10–20 $\mu$m in diameter are Visible, along with many grains about 1 $\mu$m or less in diameter.

Example 2

Commercially available GaN powder (0.85 g) was pressed into the form of a cylindrical pill measuring 0.440" (11.2 mm) diameter and 0.165" (4.2 mm) thickness and having a density of 2.07 g/cm$^3$. The pill was placed inside a container made of hexagonal boron nitride (hBN) and the entire assembly placed in a high pressure/high temperature (HP/HT) cell in a belt-type apparatus. The hBN acts as a pressure-transmitting medium and prevents contamination of the GaN pill.

Figure 3:
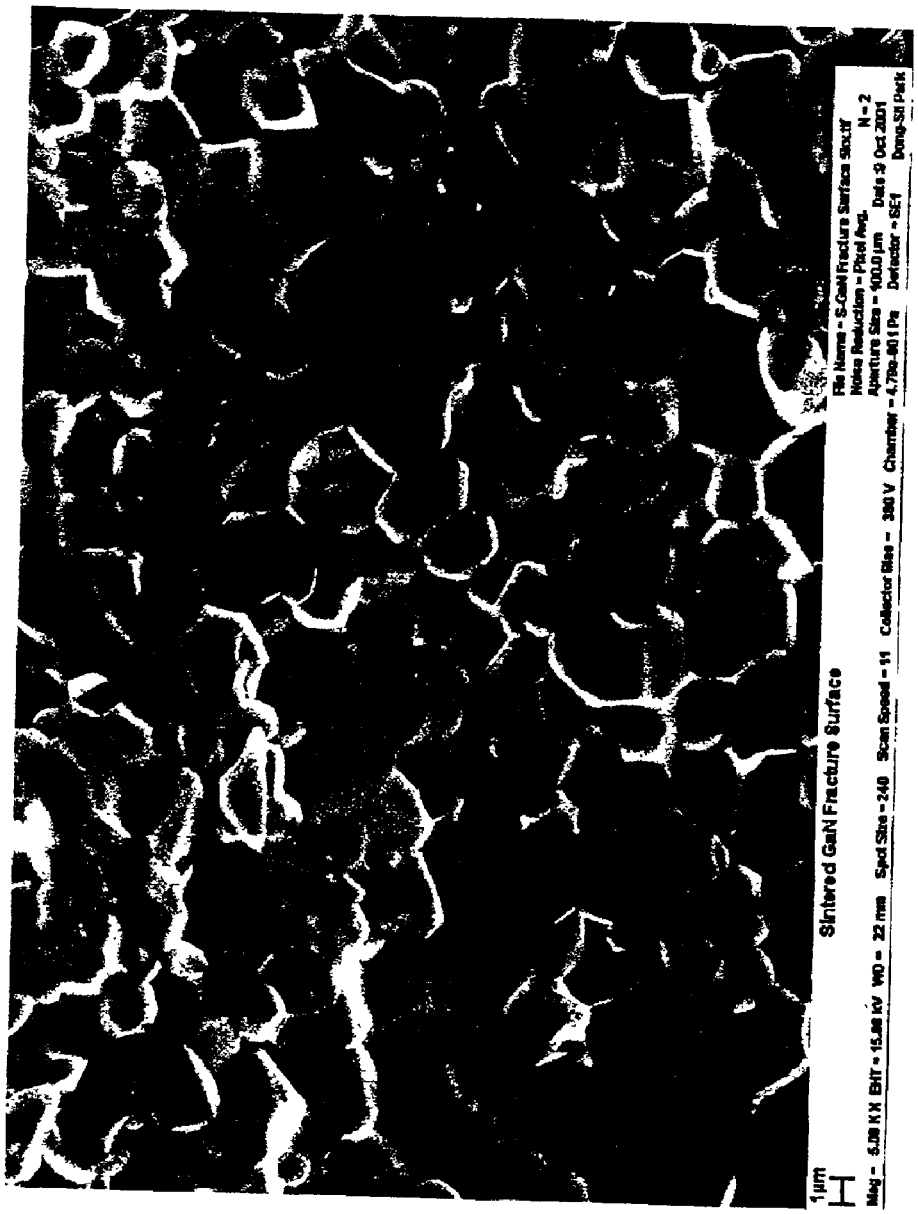
FIG. 3 is a scanning electron micrograph (5000× magnification) showing the microstructure (fracture section) of sintered polycrystalline GaN produced by sintering at 1500° C., 58 Kbar, according to the instant invention.
Figure 4:
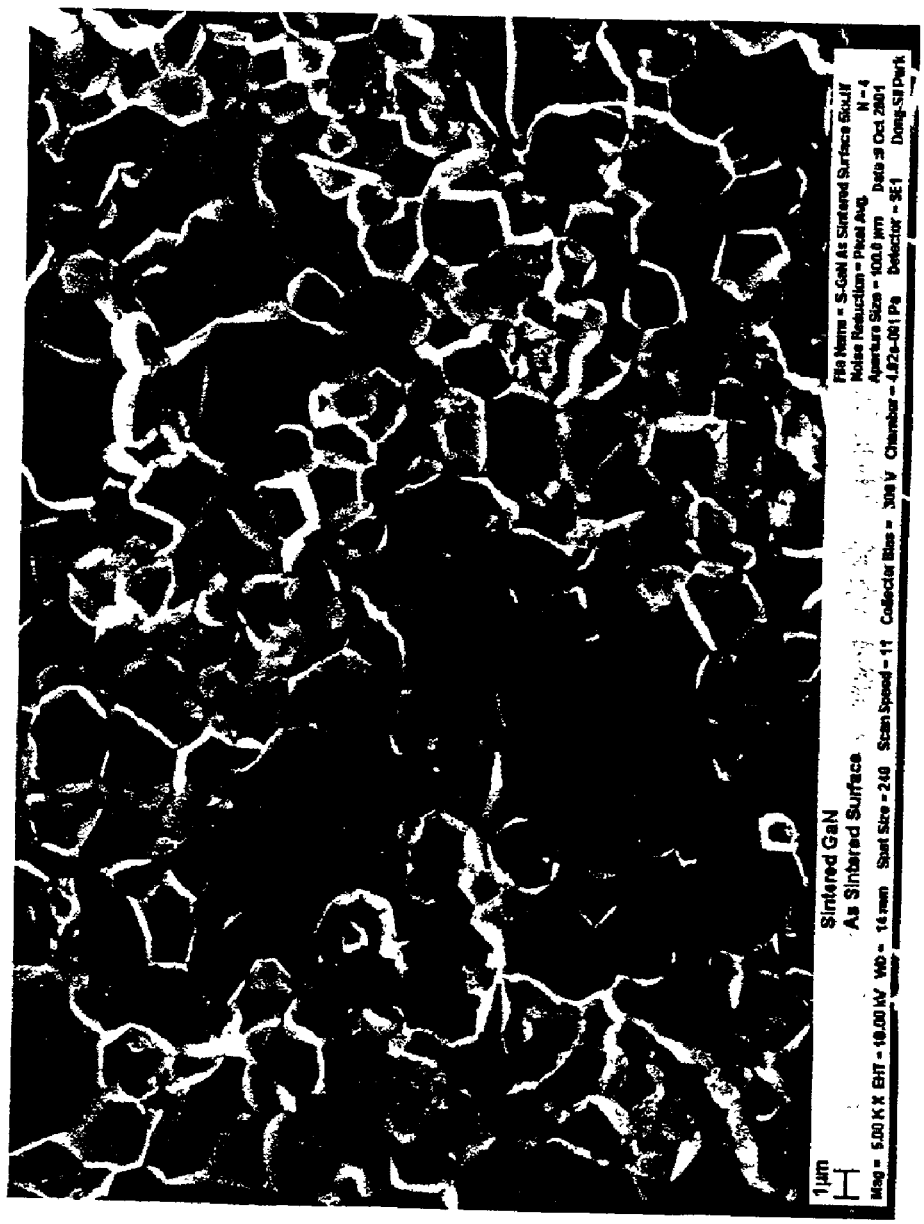
FIG. 4 is a is a scanning electron micrograph (5000× magnification) showing the surface of sintered polycrystalline GaN produced by sintering at 1500° C., 50 Kbar, according to the instant invention.

The cell pressure was gradually increased to 58 Kbar in 3 minutes 20 seconds and then electrical power was turned on to heat the cell. The power was held steady for 25 minutes so that the GaN pill was sintered at 1500° C. for 15 minutes. The sintered GaN pill was cooled by reducing the power to zero in 1.5 minutes. The pressure was held steady for another 4 minutes and the pressure was reduced to nil in 3 minutes and 20 seconds. A sintered GaN compact was recovered from the cell. This compact had a density of 5.9 g/cm$^3$ (as measured by the immersion method). The theoretical density of GaN is 6.1 g/cm$^3$. Hence, the compact made by HP/HT sintering was 97% of the theoretical density. The sintered polycrystalline GaN compact had a Vickers hardness of 12.8 GPa, which is essentially the same as the c-plane of single-crystal GaN [Drory, et al., *Appl. Phys. Lett.*, 69, 4044 (1996)]. The microstructure of the sintered polycrystalline GaN part is shown in FIG. 3. The GaN grains are equiaxed, and virtually all the grains are about 1–3 $\mu$m in diameter. The free surface of the sintered GaN part is shown in FIG. 4. Many grains about 1–3 $\mu$m in diameter are evident, along with smooth features—probably grains that formed against the container during sintering—that are somewhat larger. The root-mean-square surface roughness is seen to be about 5–20 $\mu$m.

Example 3 (Prior Art)

Figure 5:
FIG. 5 is a scanning electron micrograph (282× magnification) showing the microstructure of polycrystalline GaN produced by a prior-art CVD method.

Polycrystalline GaN was formed according to the teachings of Suscavage, et al. 1.0 g of Ga metal was placed in an alumina boat and partially covered with an alumina plate. Both alumina parts were enclosed in a quartz tube and placed in a controlled-atmosphere tube furnace. 2.0 g of NH$_4$Cl was also placed in the tube furnace near one end. The chamber was evacuated using house vacuum and then refilled with argon. These steps were repeated once more. Then, the chamber was put under flowing argon at a rate of 1 SCFH and NH$_3$ at 0.5 SCFH. After 10 min, the temperature of the furnace was raised to 800° C. When it reached temperature, the alumina crucible containing NH$_4$Cl was heated to ~250° C. using a secondary heater. The system was kept under these conditions for 4 hr, and then the heaters were turned off. At the conclusion of the run, films of polycrystalline GaN were removed from the alumina crucible and lid. The microstructure of the film is shown in FIG. 5. The film has a columnar microstructure and a rough surface, in contrast to the polycrystalline GaN formed by sintering, and many grains larger than 100 $\mu$m are present.

What is claimed is:

1. Polycrystalline gallium nitride (CaN), having an apparent density of between about 5.5 and 6.1 g/cm$^3$, a Vickers hardness of above about 1 GPa, eguiaxed grains with an average size of between about 0.01 and 50 $\mu$m, and wherein the atomic fraction of gallium ranges from between about 49% to 55%.

2. The GaN of claim 1, which has a thickness or minimum dimension of between about 0.2 mm and 1 m.

3. The GaN of claim 1, which has a diameter or maximum dimension of between about 1 mm and 1 m.

4. The CaN of claim 1, having surfaces that are substantially smooth, with a root-mean-square roughness below about 100 $\mu$m.

5. The GaN of claim 4, having surfaces that are substantially smooth, with a root-mean-square roughness below about 20 $\mu$m.

6. A method for making sintered polycrystalline gallium nitride (GaN), which comprises the steps of:
    (a) enclosing and sealing GaN as one or more of powder or a cold-pressed pill, in a non-metallic container;
    (b) subjecting said container to hot isostatic pressing (HIPing) at a temperature ranging from about 1150° C. to 1300° C. and a pressure ranging from between about 1 and 10 Kbar; and
    (c) recovering polycrystalline GaN from said container.

7. The method of claim 6, wherein said non-metallic container is evacuated of air prior to sealing.

8. The method of claim 6, wherein said HIPing is conducted for a time ranging from about 2 minutes to about 24 hours.

9. The method of claim 6, wherein said recovering step includes grinding off the container from said sintered polycrystalline GaN.

10. The method of claim 6, wherein said sintered polycrystalline GaN has a thickness or minimum dimension of between about 0.2 mm and 1 m.

11. The method of claim 6, wherein said sintered polycrystalline GaN has a diameter or maximum dimension of between about 1 mm and 1 m.

12. The method of claim 6, wherein said sintered polycrystalline GaN has equiaxed grains with an average size of between about 0.01 and 50 $\mu$m.

13. The method of claim 6, wherein said sintered polycrystalline GaN has surfaces, which are substantially smooth, with a root-mean-square roughness below about 100 $\mu$m.

14. The method of claim 13, wherein said sintered polycrystalline GaN has surfaces, which are substantially smooth, with a root-mean-square roughness below about 20 $\mu$m.

15. The method of claim 6, wherein said GaN enclosed in said container is a powder.

16. The method of claim 6, wherein said GaN enclosed in said container is a cold-pressed pill.

17. A method for making sintered polycrystalline gallium nitride (GaN), which comprises the steps of:
    (a) placing GaN as one or more of powder or a cold-pressed pill in a high pressure/high temperature (HP/HT) reaction cell;
    (b) placing said reaction cell in a HP/HT apparatus;
    (c) subjecting said container to a temperature ranging from about 1200° to 1800° C. and a pressure ranging from about 5 to 80 Kbar; and
    (d) recovering polycrystalline GaN from said reaction cell.

18. The method of claim 17, wherein step (c) is conducted for a time ranging from about 2 minutes to about 24 hours.

19. The method of claim 17, wherein said recovering step includes grinding.

20. The method of claim 17, wherein said sintered polycrystalline GaN has a thickness or minimum dimension of between about 0.2 mm and 1 m.

21. The method of claim 17, wherein said sintered polycrystalline GaN has a diameter or maximum dimension of between about 1 mm and 1 m.

22. The method of claim 17, wherein said sintered polycrystalline GaN has equiaxed grains with an average size of between about 0.01 and 50 $\mu$m.

23. The method of claim 17, wherein said sintered polycrystalline GaN has surfaces, which are substantially smooth, with a root-mean-square roughness below about 100 $\mu$m.

24. The method of claim 23, wherein said sintered polycrystalline GaN has surfaces that are substantially smooth, with a root-mean-square roughness below about 20 $\mu$m.

25. The method of claim 17, wherein said GaN enclosed in said container is a powder.

26. The method of claim 17, wherein said GaN enclosed in said container is a cold-pressed pill.

* * * * *